(No Model.)
E. M. KNIGHT.
FILTER.
No. 468,664. Patented Feb. 9, 1892.
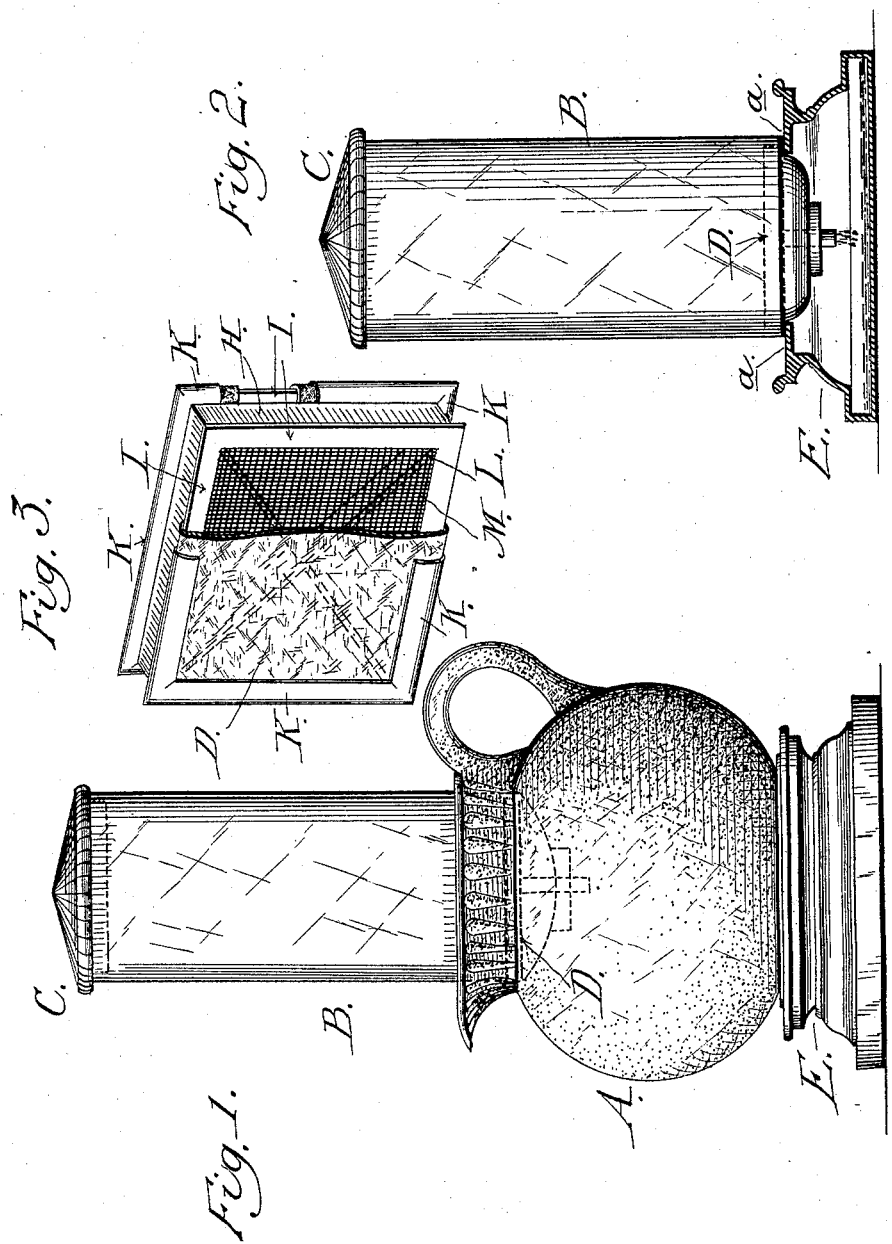
WITNESSES
Chapman Fowler
M. M. Evans
INVENTOR
Edward M. Knight
by A. H. Evans & Co
his Attorneys

UNITED STATES PATENT OFFICE.

EDWARD M. KNIGHT, OF SAN FRANCISCO, CALIFORNIA.

FILTER.

SPECIFICATION forming part of Letters Patent No. 468,664, dated February 9, 1892.

Application filed July 13, 1891. Serial No. 399,350. (No model.)

*To all whom it may concern:*

Be it known that I, EDWARD M. KNIGHT, a citizen of the United States, residing at San Francisco, in the county of San Francisco and State of California, have invented certain new and useful Improvements in Filters, as set forth in the accompanying drawings, forming part of this specification, in which—

Figure 1 represents a side view of a filter which embodies a supply-chamber, a receiving-chamber for the filtered water, and a hollow stand which serves as a support for the filtered-water chamber, and also as a support for the filter-chamber when removed. Fig. 2 is a sectional view of the stand, showing in elevation the filtered-water chamber removed and the filter-chamber supported upon the stand so as to receive its drip. Fig. 3 is a detail of one of my filter-frames.

My invention relates especially to that class of filters employing a supply-chamber for unfiltered water and a second chamber for the filtered water received from the first-named chamber; and my invention consists, essentially, in the employment with said chambers of a hollow stand or base which serves as a support for the filtered-water chamber, and also as a support for the unfiltered-water chamber to receive the drip therefrom during the temporary removal of the filtered-water chamber, as I shall hereinafter fully describe and claim.

To enable others skilled in the art to which my invention appertains to make and use the same, I will now describe its construction and indicate the manner in which the same is carried out.

In the present instance I have shown the chamber or receptacle for the filtered water as being in the form of a jug, bowl, or pitcher A, having a handle by which it is manipulated to pour out the filtered water when needed for table or other use. This receptacle, which I designate the "filtered-water chamber," is preferably composed of glass, porcelain, stone, or analogous material, of suitable design and ornamentation to make it attractive, and it is designed to receive and support the lower end of the vessel or chamber B, also preferably made of the same material as the vessel or chamber A, and ornamented in any manner to impart to it an attractive appearance.

This chamber or vessel B has a cover C, and in its lower portion is placed or fitted any suitable or well-known filtering medium D, secured in a frame or support H, as shown in Fig. 3, and which will be hereinafter described.

In practical use the chamber or receptacle for the filtered water is supported upon a hollow stand E, suitably ornamented and of circular form, having a central opening in its sunken upper surface of a diameter that is about equal to the diameter of the base of the filtered-water chamber and the diameter of the lower end of the unfiltered-water chamber, the said opening in the stand being bounded by an annular flange *a*, upon which the said chambers rest. This stand E answers a twofold purpose. It serves as a support for the receiving-vessel or filtered-water chamber, which in turn supports the unfiltered-water chamber, and it also serves at times as a holder for the unfiltered-water chamber when the same is temporarily removed from the filtered-water chamber. To make this part of my invention especially manifest, I will here state that the chamber for the filtered water is here shown as being a pitcher, which is removably seated on its base and receives the water which has filtered through the first chamber. Now, as this filtered water in the chamber A is designed for drinking purposes, it is manifest that the vessel or receptacle containing it must be removed from its stand and also from its engagement with the filter-chamber above it. When this is done, the water in the filter-chamber B will continue to percolate from the latter chamber and will drop upon the cloth, table, or floor unless some vessel or means is handy to receive it during the temporary removal of the chamber A. Therefore I construct the open top of the stand E so that it shall receive the filter-chamber when removed from the chamber A, whereby the drip from the filter-chamber will enter the hollow base and not soil the cloth, table, or floor.

When the desired amount of filtered water is poured from the vessel A, the filter-chamber is lifted from the stand E, the vessel A placed thereon, and the filter-chamber placed upon the vessel A, so that the water from the filter-chamber will fall directly into the chamber A, as before stated.

By reason of the above construction I provide a portable filter for household purposes and form the several parts thereof so that when the vessel containing the filtered water is temporarily removed the vessel containing the unfiltered water is kept near at hand and so disposed of that its drippings will not soil the table, cloth, or floor.

While the frame H, which carries the filtering medium may be of any well-known form, the construction which I prefer to use is shown in Fig. 3, wherein the casing of the frame, may be made of one piece from a suitable blank and then bent to form a rectangular or other shaped frame with surrounding flanges I extending from its walls parallel with the front and rear sides of the frame. This enables the sides of the frame to present straight surfaces, over which the asbestos or other fabric is placed, with its edges bent over the flanges and then secured by clamping-strips K, which embrace the flanges I and turned-over edges of the asbestos, and are pressed closely upon the same to form a water-tight joint between these parts. This greatly simplifies the construction of the frame and enables the asbestos to be stretched tightly over the frame and be rigidly secured.

The frame may be provided with interior bracing-strips L, as in my former Patent No. 445,223, granted January 27, 1891, to which a perforated plate, wire-gauze, or lattice-work M is soldered or otherwise secured, so that the inner surface of the asbestos shall lie against it, as fully disclosed in said patent before mentioned.

Having thus described my invention, what I claim as new, and desire to secure by Letters Patent, is—

1. A filter consisting of readily-removable upper and lower chambers, the upper one of which has its base adapted for seating upon the upper portion of the lower one, said upper chamber adapted to receive unfiltered water and provided with a filtering medium, and the lower chamber adapted to receive the filtered water, and a hollow base or stand having a seat common to the bases of both vessels and adapted to receive the drip of the unfiltered water when the filtered-water chamber is temporarily removed, substantially as herein described.

2. A filter-frame having its front and rear sides provided with outwardly-extending flanges, asbestos or fibrous material placed against said sides with its edges turned over the flanges, a clamping-strip over the bent-over edges of the asbestos or fibrous material, whereby a water-tight joint is formed, and a foraminous plate contiguous to the asbestos or fibrous material, substantially as herein described.

EDWARD M. KNIGHT.

Witnesses:
T. WALTER FOWLER,
CHAPMAN FOWLER.